No. 641,720. Patented Jan. 23, 1900.
J. MURPHY.
ORE WASHER AND AMALGAMATOR.
(Application filed May 4, 1899.)
(No Model.) 2 Sheets—Sheet I.
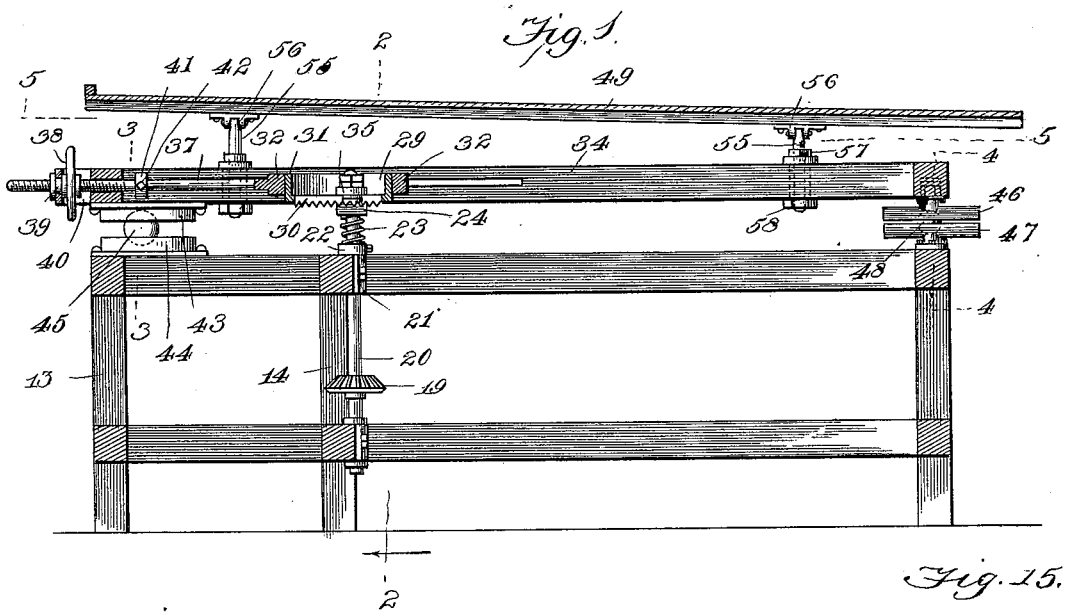
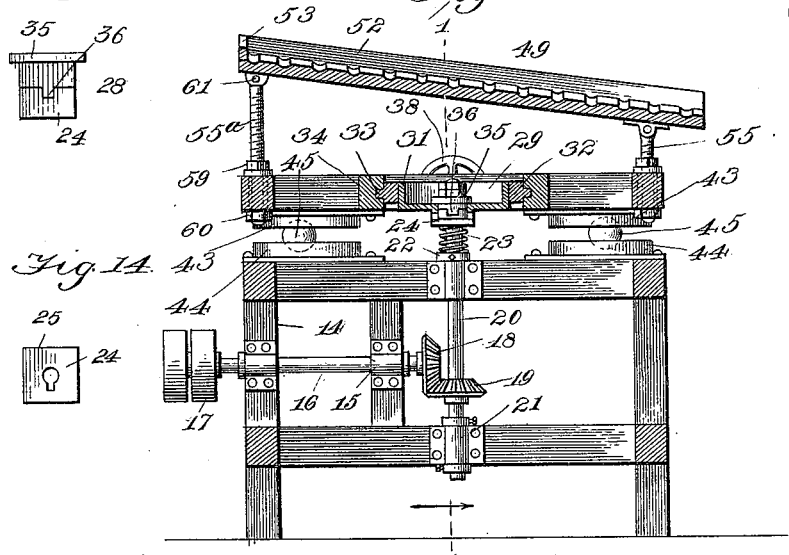
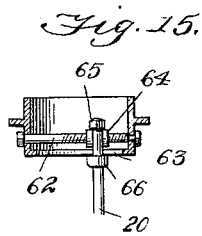
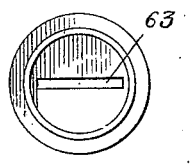
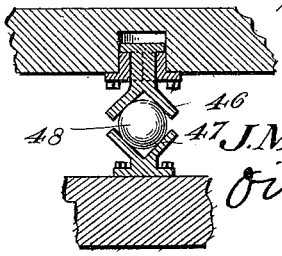
Witnesses
J. C. Shaw
Chas. E. Brock
Inventor
J. Murphy,
by
Attorneys
THE NORRIS PETERS CO., PHOTO-LITHO., WASHINGTON, D. C.

No. 641,720. Patented Jan. 23, 1900.
J. MURPHY.
ORE WASHER AND AMALGAMATOR.
(Application filed May 4, 1899.)
(No Model.) 2 Sheets—Sheet 2.
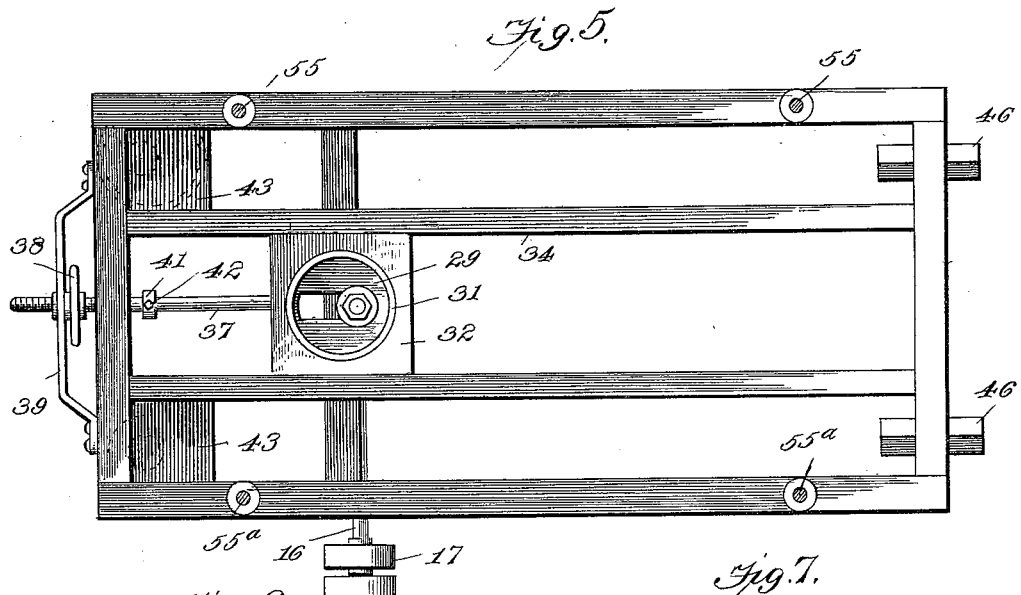
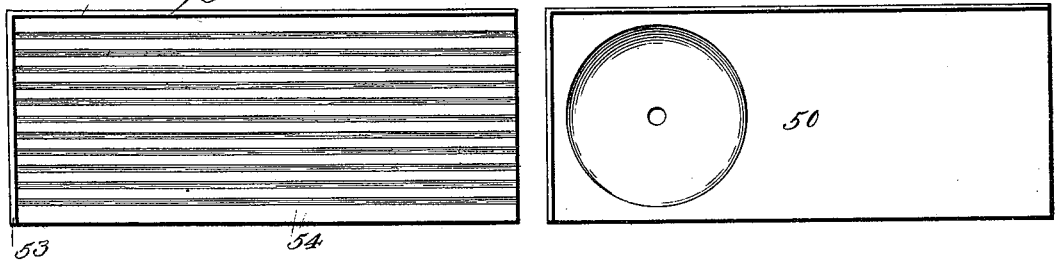
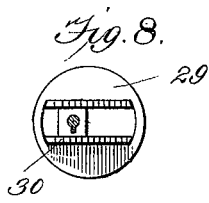
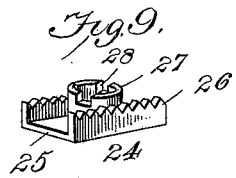
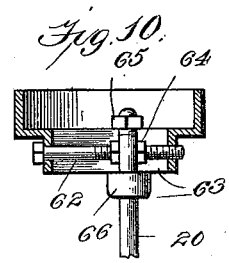
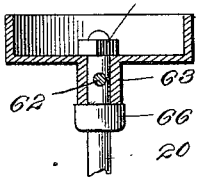
Witnesses
Inventor
J. Murphy,
Attorneys

UNITED STATES PATENT OFFICE.

JAMES MURPHY, OF BUTTE, MONTANA.

ORE WASHER AND AMALGAMATOR.

SPECIFICATION forming part of Letters Patent No. 641,720, dated January 23, 1900.

Application filed May 4, 1899. Serial No. 715,588. (No model.)

*To all whom it may concern:*

Be it known that I, JAMES MURPHY, a citizen of the United States, residing at Butte, in the county of Silver Bow and State of Montana, have invented a new and useful Ore Washer and Amalgamator, of which the following is a specification.

My invention relates to machines for extracting ores by agitation and washing or amalgamating, the object of the invention being to provide a machine of this class of simple form and reliable in operation.

With this object in view my invention consists in the improved construction, arrangement, and combination of parts hereinafter fully described and afterward specifically pointed out in the appended claims.

In order to enable others skilled in the art to which my invention most nearly appertains to make and use the same, I will now proceed to describe its construction and operation, reference being had to the accompanying drawings, forming part hereof, in which—

Figure 1 is a view in vertical longitudinal section on the line 1 1 of Fig. 2 of a machine constructed in accordance with my invention. Fig. 2 is a view of the same in vertical transverse section on the line 2 2 of Fig. 1. Fig. 3 is a detail sectional view on the line 3 3 of Fig. 1. Fig. 4 is a similar view on the line 4 4 of Fig. 1. Fig. 5 is a horizontal sectional view on the line 5 5 of Fig. 1. Fig. 6 is a top plan view of the style of pan used for washing baser ores. Fig. 7 is a top plan view of a pan for amalgamating gold ore. Fig. 8 is a bottom plan view of the eccentric. Fig. 9 is a detail perspective view of the washer which engages under the eccentric. Fig. 10 is a detail vertical sectional view showing another form of eccentric. Fig. 11 is a similar view on a plane at right angles to that of Fig. 10. Fig. 12 is a top plan view of a pan for use in placer-mining. Fig. 13 is a detail view of the washers 24 and 35. Fig. 14 is a bottom plan view of the washer 24. Fig. 15 is a modification of another form of eccentric in vertical section, and Fig. 16 is a bottom plan view of the same.

Like numerals of reference mark the same parts wherever they occur in the various figures of the drawings.

A machine embodying my invention comprises three main parts—viz., a stationary frame composed of suitable strong timbers, a second framework above and agitated on the first by mechanism to be hereinafter described, and, third, the pan adjustably mounted on the movable frame.

Referring to the drawings by numerals, 13 indicates an upright at one end of the stationary frame, and 14 a similar upright of the same frame about one-quarter of the length of the frame from uprights 13, said uprights being connected by a cross-beam 14ª, which is braced to the top of the machine by a short upright 14ᵇ. Upon these uprights 14 and 14ᵇ are secured bearings 15, on which is journaled a horizontal shaft 16, having a suitable belt-pulley 17 on its outer end and at its inner end a bevel-gear 18, engaging a bevel-gear 19 on a vertical shaft 20, mounted in bearings 21, secured to the cross-beam 14ª and the stationary frame.

Upon the shaft 20, just above its upper bearing, is a washer 22, and coiled around the shaft, above the washer, is a spring 23. Surmounting the spring on the shaft is a casing 24, which I term a "washer," composed of a rectangular plate 25, with vertical toothed flanges 26 at the two opposite sides and an upwardly-projecting central sleeve 27, having diametrical notches 28. This washer 25 is keyed to the shaft in any well-known manner.

Above the washer 24 on the shaft 20 is the eccentric 29, circular in form, having downwardly-projecting toothed flanges 30, engaging toothed flanges 26, and upwardly-projecting peripheral flanges 31, fitting in the circular opening of a rectangular sliding frame 32, having side ribs 33, seated in opposite grooves in longitudinal beams 34 of the movable frame.

On the shaft 20 is a washer 35, fitting in the space between the toothed flanges 30 of eccentric 29, having a rib 36 at its lower end to fit in notches 28 and resting at its upper end upon the eccentric 29.

To the sliding frame 32 is secured a rod 37, extending through the end of the movable frame, being screw-threaded for some distance from its outer end. On the threaded end of rod 37 is a hand-nut 38, having a peripheral groove 39, in which engages a keeper 40, secured to the outside of the frame. A short sleeve 41 is secured on rod 37, inside the end bar of the frame, by a set-screw 42.

At one end of the movable frame inverted concave bearing-plates 43 are secured on its under side immediately above and facing similar bearing-plates 44, secured on the top of the movable frame, the balls 45 resting in their concavities. At the opposite end inverted-V-shaped longitudinal bearing-plates 46 are rigidly secured to the under side of the movable frame, while immediately below them are similar V-shaped plates 47, swiveled on vertical axis mounted in the stationary frame. These plates 46 and 47 might be reversed in position and the plate 46 swiveled, if desired. Balls 48 rest between the two plates.

The machine as thus described operates as follows: Power being applied, the eccentric is rotated and communicates motion to the movable frame, one end moving circularly on balls 45 and the other end reciprocating and oscillating laterally on balls 48. To adjust the extent of these movements, it is only necessary to turn the hand-nut 38, which will move the rod 37 longitudinally, altering the position of the eccentric with relation to its shaft, the toothed flanges 30 slipping over the toothed flanges 26, the spring 23 yielding to permit of this movement and immediately forcing the teeth into engagement after each movement.

49 indicates the upper member or pan of the machine, which, as shown in Figs. 1, 2, and 6, for use in washing base ores, will be made of pine lumber, but when used for amalgamating gold will be provided with copper plates 50, concaved and having a central opening to be plugged when desired, as shown in Figs. 7 and 12. When of wood, the pan 49 will have a flange 52 along one side and a similar flange 53 along one end, and will be inclined to bring that side and end higher than the opposite side and end, and will be provided with parallel longitudinal grooves 54 in its upper surface.

The mechanism for adjusting the inclination of the pan consists of bolts 55 near the ends of its low side and bolts 55ª near the ends of the high side. The bolts 55 are pivoted on longitudinal pins in brackets 56, secured to the under surface of the pan, and pass through openings in the top of the movable frame, being provided with nuts 57 and 58 above and below said frame, respectively, while the bolts 55ª are similarly secured and adjusted by nuts 59 and 60, but are unattached to the pan, the pan resting on their heads, which are provided with holes 61 to receive bars to hold them from turning while adjusting the nuts. The low side and end of the pan project beyond the sides of the lower frame, and as the machine is operated the concentrates will pass off the end and the waste off the side into suitable receptacles.

In placer-mining the movable frame will preferably be made triangular, as shown in Fig. 3, thereby lengthening it and economizing in power to operate it. In this case there need be only one set of longitudinal V-shaped bearing-plates, as shown, and the eccentric may be constructed as shown in Figs. 10 and 11 or Figs. 15 and 16, in which it is provided with a diametrically-placed bolt 62, passing centrally through the space between downward-projecting flanges 63 and threaded through the vertical shaft, whereby by turning the bolt the relation of the eccentric to the shaft will be altered by increasing or diminishing its eccentricity, and thus altering the extent of movement of the pan. Lock-nuts 64 secure the bolt when adjusted, and a nut 65 on the upper end of the vertical shaft secures the flange 63 between said nut and a collar 66 on the vertical shaft.

While I have illustrated and described what I consider to be the best means now known to me for carrying out my invention, I do not wish to be understood as restricting myself to the exact forms and constructions shown, as many slight changes therein or variations therefrom might suggest themselves to the ordinary mechanic, all of which would be clearly included within the limit and scope of my invention.

Having thus fully described my invention, what I claim as new, and desire to secure by Letters Patent of the United States, is—

1. In a gold-ore washer, the combination with a main frame provided with a vertical operating-shaft, of a washer on top of the shaft provided with toothed flanges, a horizontally-movable frame on the main frame, an eccentric on the movable frame provided with toothed flanges to register with the toothed flanges of the washer, means for holding said flanges yieldingly together, and a screw-threaded shaft for moving the flanges longitudinally upon each other, substantially as shown and described.

2. In a gold-ore washer, the combination with a main frame, provided with a vertical operating-shaft, of a washer on the upper end of the shaft provided with toothed flanges and a notched sleeve, a horizontally-movable frame on the main frame, an eccentric on the movable frame provided with toothed flanges and a rib, a spring for holding the toothed flanges of the washer in yielding engagement with the flanges of the eccentric, and a screw-threaded shaft for moving said flanges longitudinally upon each other, substantially as shown and described.

3. In a gold-ore washer, the combination with a main frame, provided with a vertical operating-shaft, of a washer on the shaft provided with toothed flanges, a horizontally-movable frame on the main frame, a sliding frame in the movable frame provided with a circular opening, an eccentric in said opening, provided with an upwardly-projecting flange at its periphery and with downwardly-projecting toothed flanges, means for adjustably securing the eccentric to the washer, and a screw-threaded shaft connected at one end with the sliding frame and projecting through the movable frame at the other end, substantially as shown and described.

4. The combination of the stationary frame, a movable frame surmounting it, having a longitudinally-arranged grooved portion, a slidable plate therein, an adjustable eccentric connected to said plate, a threaded adjusting-rod projecting from said plate and extending through the end of the movable frame inverted concave bearing-plates secured near one end of the two frames and facing each other, balls in their concavities, longitudinally-grooved bearing-plates secured to the movable and stationary frames near their opposite ends and balls in their grooves, substantially as described.

5. The combination with the stationary frame, of a movable frame surmounting it, the inverted concave bearing-plates, secured near the end of the two frames and facing each other, balls in their cavities, longitudinally-grooved bearing-plates secured to the movable and stationary frames near their opposite ends one of them being mounted on a swiveling vertical axis a pan having a concave depression mounted on said movable frame and rotatable screw-threaded supporting-rods connecting said frame and pan whereby the same can be adjusted, substantially as described.

6. The combination with the stationary and movable frames, of the vertical shaft, a washer on it above the frame, a spring above the washer, a washer-casing above the spring having diametric upwardly-projecting toothed flanges, the eccentric above the flanged washer having similar and registering downward-projecting toothed flanges, a casing for the eccentric carried by the movable frame and means for longitudinally adjusting the casing, substantially as described.

JAMES MURPHY.

Witnesses:
JOHN HENNESSY,
THOS. SCANLON.